Patented Dec. 15, 1925.

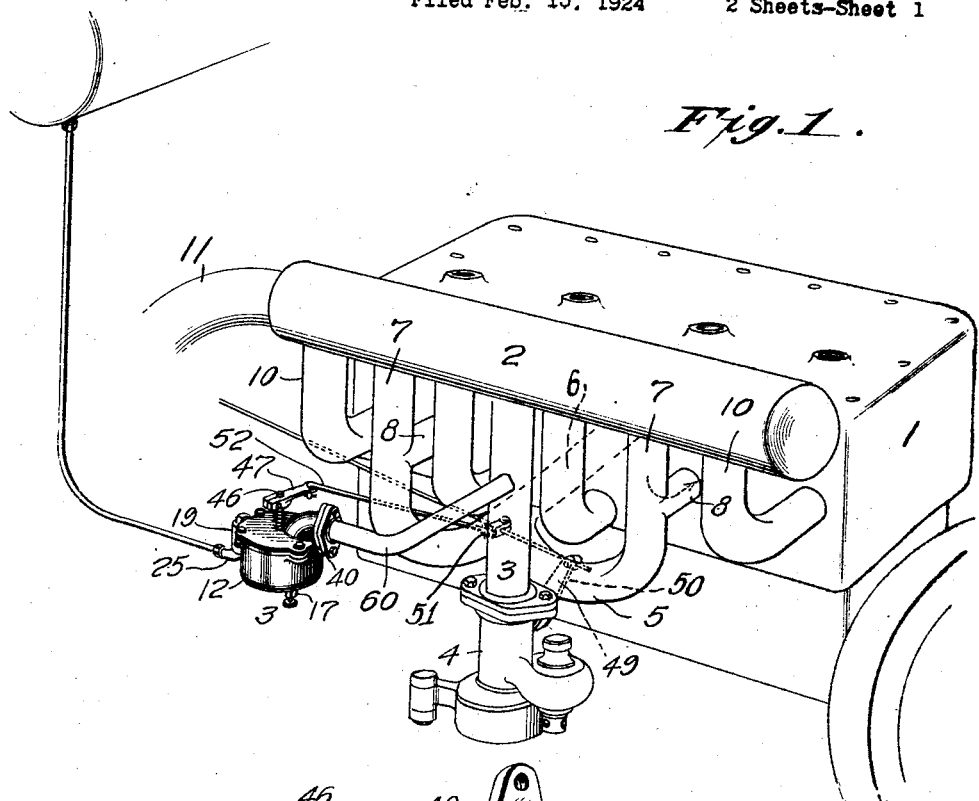

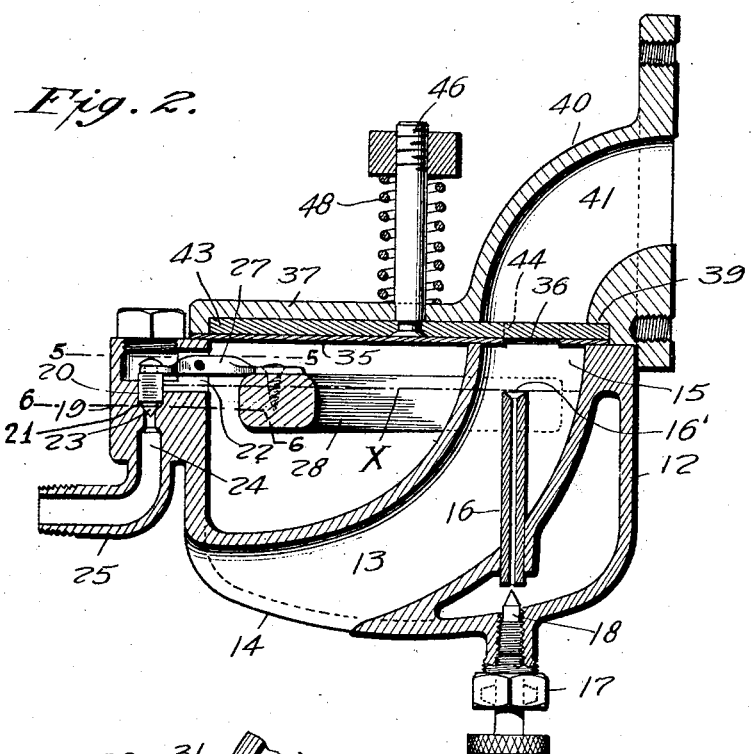
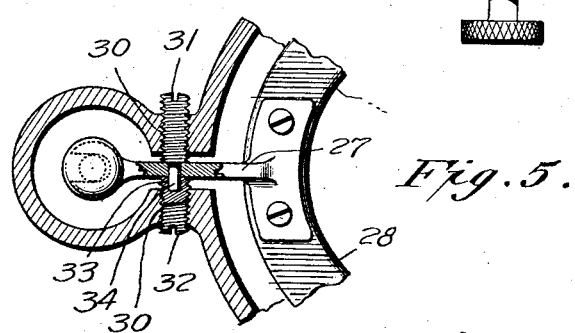
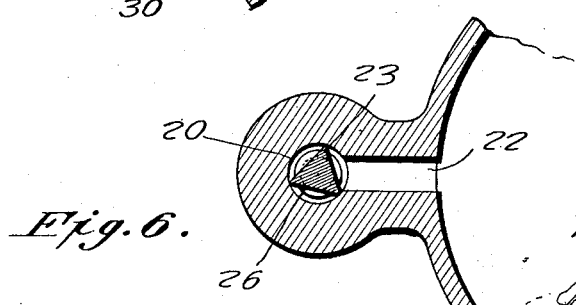

1,565,453

UNITED STATES PATENT OFFICE.

THEODORE B. HOGG, OF DAYTON, OHIO.

FUEL MOISTENER.

Application filed February 15, 1924. Serial No. 693,081.

*To all whom it may concern:*

Be it known that I, THEODORE B. HOGG, a citizen of the United States of America, residing at Oakwood, Dayton, in the county of Montgomery and State of Ohio, have invented certain new and useful Improvements in Fuel Moisteners, of which the following is a specification.

This invention relates to improvements in means for increasing the vaporization of the heavier hyrocarbon oils for fuel purposes for internal combustion engines.

It has been found in vaporizing heavy oil for fuel for internal combustion engines, the resultant gaseous product is extremely volatile, with the result that when it is introduced into the cylinders, it rapidly ignites under the influence of the heat, which makes it difficult to handle practically, owing to the fact that the period of timing cannot be accurately determined.

In my experiments, I have discovered that this practical difficulty can be overcome by subjecting the volatile mixture of hydrocarbon fuel and air to a mixture of moisture and air, previous to introduction of the fuel to the vaporizer. The high heat in the vaporizer, as is well known, changes the physical characteristics of the oil and air into a highly volatile gaseous mixture, which when charged with moisture and further air at the time of vaporization, seems to retard the volatility of the gas and yet increase or enhance its explosive force and renders it capable of being controlled, to the extent at least, where it can be determined when it is to be ignited.

A further object of the invention is the provision of means for effectually utilizing the heavy hydrocarbon oils for use in internal combustion engines, by providing means controlled by the throttle lever of an oil carbureter, whereby to first admit a supply mixture of air and oil to a heated vaporizer, and subsequently admit a regulated supply of air and moisture to the subsequent supply of air and oil mixture as same is introduced to the vaporizer. The oil and air mixture first supplied is provided to maintain the requisite volume of material to maintain combustion in the cylinders and heat in the vaporizer on low throttle, and the moisture mixture is subsequently provided to retard the volatility of the gaseous mixture in the cylinders in order to be able to regulate and determine the time of ignition of the gaseous mixture when operating at high speed.

A further object of the invention is to provide means for gradually increasing the proportion of the supply of moisture and air in proportion to the supply mixture of oil and air under the influence of the suction stroke of the engine.

The invention also aims to provide an improved water atomizer adapted for use in conjunction with a carbureter for carbureting hydrocarbon fuel used in internal combustion engines.

The invention also relates to improvements in the details of construction and arrangement of parts which will be hereinafter described and particularly pointed out in the claims.

In the accompanying drawings:

Fig. 1 is a perspective view showing in diagrammatic form, the application of my invention.

Fig. 2 is a central vertical section of my improved water atomizer.

Fig. 3 is a perspective view of the bowl of the atomizer.

Fig. 4 is a similar inverted view of the cover of the atomizer.

Fig. 5. is a detail cross section on the line 5—5 of Fig. 2.

Fig. 6 is a similar section on the line 6—6 of Fig. 2.

In order to illustrate my invention in its practical application, I have shown conventionally in Fig. 1, an internal combustion engine 1, equipped with a vaporizer 2, of the general type, disclosed in my co-pending application for patent, Serial No. 672,448, filed November 2, 1923. A fuel supply pipe 3 communicates with the vaporizer 2, and is connected at its lower end to a carbureter 4, designed for carburetting heavy fuel oil. 5—5 indicate branches of another fuel supply pipe 6, connected at its opposite end to a carbureter (not shown) designed for carburetting lighter fuel oil, such for instance, as gasoline. The branches 5—5 are extended to the vaporizer, as at 7—7 and intermediate their ends there are branch fuel supply pipes 8—8, which lead to the cylinders.

When the heavy hydrocarbon carbureter is used, the vaporized gaseous mixture from the vaporizer is drawn into the cylinders by the suction of the engine through the portions 7—7 of the branch pipes and thence through the branch pipes 8—8. However, when the lighter fuel mixture is used, the gaseous mixture from the carbureter at the end of pipe 6, is drawn direct from the carbureter through pipe 6, branches 5—5, and branch pipes 8—8 to the cylinders by the suction in the cylinders.

10 indicates exhaust pipes between the motor block and the vaporizer, and 11 the pipe at the end of the vaporizer, through which the spent gases introduced to the vaporizer are exhausted to the atmosphere.

The construction thus far described is substantially the same as that disclosed in the before mentioned application, but it is necessary to a complete understanding of the present invention.

In using the vaporizer in connection with an explosive engine, the latter is first started with high test gasoline as fuel supplied by a carbureter at the end of pipe 6, through branches 5 and 8 to the cylinders, hence the combustible mixture does not pass through the vaporizer before being introduced to the cylinder. The spent or exhaust gases from the motor pass through the various pipes 10—10 to a heating chamber in the vaporizer and thence to the atmosphere through the exhaust pipe 11. When the vaporizer has been sufficiently heated by the exhaust gases resulting from the use of lighter fuel, the carbureter 4 is brought into play to introduce heavy hydrocarbon oil to the vaporizer. The mixture from the carbureter passes through the pipe 3 into a vaporizing chamber in the vaporizer, heated by the exhaust gases from the motor, and is drawn from said chamber through the pipes 7 and branches 8, to the various cylinders by the suction of the engine.

One of the essential features of this invention is the provision of means for introducing a mixture of moisture and air to the heavy hydrocarbon oil introduced to the vaporizer, to retard the explosion of the gaseous mixture resultant from the vaporization of the oil in the vaporizer, and to enhance and improve the explosive force of such gaseous mixture. To meet this contingency, I have devised a special form of water atomizer which cooperates with the carbureter 4, when using the heavy hydrocarbon oil. This water atomizer comprises a bowl 12, formed with an upwardly curved air inlet duct 13, extending from the bottom rear portion to the top forward portion, air entering the inlet end 14 and passing out the outlet end 15, when the atomizer is in use. Extending upwardly through the conduit 13, and in alignment with the outlet 15, is a pipe 16, which terminates at its upper end some distance below the horizontal plane of the top of the bowl, the upper end of the pipe being countersunk at 16′ to maintain a globule of water to be readily taken up and moved with the air when starting the use of the atomizer. The lower end of this pipe extends through the wall of the conduit 13, and terminates at a point above the bottom of the bowl. A threaded opening is formed in the bottom of the bowl in alignment with the pipe 16, and engaging in this opening is a lock nut 17, through which extends a needle valve 18, to control the inlet end of the pipe 16. On one side of and cast with the bowl is a boss 19, formed with a valve chamber 20 which is provided with a valve seat 21, and which communicates with the interior of the bowl through a transverse passage 22. A valve 23 is mounted and guided in the valve chamber 20, the lower end of the valve being normally seated in the valve seat 21, to close an inlet opening 24, which communicates with a water supply pipe 25. The upper end of the valve is formed with a groove 26, and fitting in the groove is the forked end of a float lever 27, which extends through the transverse passage 22, and is secured to a float 28 disposed in the bowl 12.

In order to accurately adjust the float and the valve, I have provided an adjustable mounting for the float lever 27, shown best in Fig. 5.

Transverse, threaded, aligned openings 30 are formed in the walls of the boss on opposite sides of the transverse passage 22, and in these openings fit screws 31 and 32. The screw 32 is formed at its inner end with a socket 33, while the inner end of the screw 31 is reduced to form a trunnion 34, which extends through the float lever 27 and into the socket 33. By means of this construction, it will be seen that the lever 27 is mounted on the trunnion 34, and is confined between the end of screw 32 and the flange formed by the trunnion on screw 31. Obviously by adjusting the two screws, the float may be accurately positioned and set in the bowl when assembling the parts.

On top of the bowl is a thin packing plate 35, formed with an opening 36 in vertical alignment with the pipe 16. Over this packing plate is fitted a cover 37, bolted to the bowl at 38, and provided on its underside with a valve seat 39. At one side of the cover is an upwardly curved cast extension 40 formed with a curved conduit 41, which is in alignment with the outlet end of the curved air conduit 13 in the bowl.

Fitting in the valve seat 39 is a rotary disc valve 43, having an elongated opening 44, arranged to register with the opening 36 in the washer and the air conduit 13, when the valve is rotated. The valve is confined in the valve seat 39 and operates on the packing plate 35 to effectually prevent leakage at the top of the bowl. A stem 46 projects from the rotary valve and extends through an opening formed in the cover, and to the outer end of the stem is attached an arm 47. Between the arm 47 and the cover is a spring 48, which acts to hold the valve tight against the packing plate to insure of a tight joint around the top of the bowl.

49 indicates a part of the throttle lever of the carbureter 4, connected to the valve arm 50 of the carbureter in the usual way. Pivotally connected to this lever at 51 is a rod 52, which at its opposite end is pivoted to the outer end of the arm 47 of the water atomizer, so that in the operation of the heavy hydrocarbon oil carbureter, the rotary valve 43 will likewise be operated.

It may here be stated that the rotary valve 43 is so positioned that its opening 44 will not register with the outlet opening of the conduit 13 for some time after the beginning of the opening of the valve of the carbureter 4; the time of the opening depending entirely upon the conditions under which the motor is operating. It may be found advisable to delay operation of the water atomizer until the valve of the oil carbureter is opened one quarter or one-half its full stroke, this, as stated, depending upon the conditions of oil, load, motor, and other factors. In any event it is to be understood that I prefer that the introductions of the added mixture of water and air to the oil be delayed until a mixture of oil and air from carbureter 4 is first introduced. Hence, in the operation of the throttle, there is a period of lost motion in the rotary valve of the water atomizer with reference to the operation of the oil carbureter 4.

To better understand the description of the operation to follow, it may be stated that the opening 36, is preferably "pear" shape, with its smaller end arranged to first register with the air conduit 13, so that in the further movement of the valve, the relative proportion of the added mixture of air and water is gradually increased.

In operation, the light fuel carbureter is first opened in the usual way to start the motor and heat the vaporizing chamber for the subsequent use of the heavy hydrocarbon oil, as set forth in the application previously mentioned. After the vaporizer is sufficiently heated, the throttle lever 49 is actuated and the heavy fuel carbureter 4 admits a mixture of oil and air to the vaporizer, the previously heated chamber readily converting the mixture into a highly volatile gas. The light fuel carbureter is now cut off and the motor is operated by the heavy oil fuel. While throttled low, the gaseous mixture produced from the heavy oil by the vaporizer will fire in the engine in the usual way, but when the speed of the motor is increased, the heat resulting from the explosions in the cylinders is so great that the mixture has a tendency to ignite and explode prematurely, and is therefore difficult to control. As the throttle is further actuated to open wider the control valve of the heavy oil carbureter to speed up the motor, the lost motion in the connections of the rotary valve is taken up and the opening 36 is brought into registry with the air conduit 13, and a mixture of water and air is drawn in through pipe 60 and introduced with the mixture of heavy oil and air drawn in through pipe 3 by the suction of the motor. As the throttle lever is further actuated, the area of the opening 36 over the exit end of the conduit 13 is increased and the mixture of moisture and air is correspondingly increased in greater proportion to the admission of oil and water than first admitted. The moistened fluid introduced into the oil so dampens the mixture entering the vaporizer as to produce a gaseous mixture which will not explode prematurely in the cylinders of the motor, nor does it rob the mixture of its explosive force. In fact I have demonstrated that while the gaseous mixture will not be exploded by the high heat zone in the cylinders, yet I have also demonstrated that I obtain a greater power than when using the oil and air alone.

It appears that this result flows from the fact that the introduced moisture produces a vapor or steam in the gaseous mixture, sufficient to prevent explosion by heat from the cylinder and retards or diminishes the explosion point of the gas, and that the addition of this vapor or steam lends explosive force, when ignition occurs.

The level of the water in the bowl is maintained about on the level, indicated at X, the float seating the valve to close the port 24. The top of the pipe 16 is at or about on the level with the water line X, so that there is maintained in countersunk portion a globule of water. When the engine is first run with the heavy oil, the globule of water is lifted from the pipe and is shattered into fine particles and mixed with the air, which results in a moist atmospheric condition which is later mixed with the oil. When the speed of the engine is increased, the rapid succession of suctions pulls a small stream of water which is broken up by contact with the walls of the conduit and when mixed with the inrushing air through the conduit 2, produces an increased moist atmospheric condition. The air heavily ladened with moisture is carried through the pipe 60 and to the pipe 3, where it mixes with the heavy oil and air passing to the vaporizer.

The washer or packing plate 35 and the action of the spring on the stem 46, seals the bowl and effectually makes the said bowl air tight.

The moistened gaseous mixture in the vaporizer undoubtedly produces vapor or steam, and in this condition, it is introduced to the cylinders which materially increases the efficiency of the motor.

Claims:

1. An explosive engine, an exhaust gas vaporizer, a heavy fuel carbureter having communication with said vaporizer, means for controlling delivery from said carbureter, a water atomizer for delivering a moist air mixture to the communication between the heavy fuel carbureter and the vaporizer, and means for controlling the delivery from the water atomizer simultaneously with the control of the delivery from the heavy fuel atomizer, said means operating to permit initial delivery from the water atomizer following a predetermined delivery from the heavy fuel carbureter.

2. A heavy fuel carbureter, and means for mixing a moist air with the heavy fuel beyond such carbureter, said means comprising an atomizer having a float for controlling the water level therein, an air passage opening through the atomizer, a valve controlled jet opening at one end into the atomizer and at the opposite end to the air passage, the air passage opening being on a level with the normal fluid line of the atomizer and a valve for controlling the outlet from said air passage.

3. A vaporizer heated by the exhaust gases from an engine, a heavy fuel carbureter, a conduit leading from said carbureter to the vaporizer, a valve controlling said conduit, a water atomizer formed with an independent air passage to produce a moist air mixture, a conduit leading from the water atomizer to the first mentioned conduit, a valve for controlling the outlet from the water atomizer, and means adapted to simultaneously operate said valves.

In testimony whereof I affix my signature.

THEODORE B. HOGG.